3,284,263
METHOD AND APPARATUS FOR PRODUCING A LAMINATED GLAZING ASSEMBLY
Bernard Jamet, Saint-Cyr-l'Ecole, France, assignor to Societe Industrielle Triplex, Paris, France
Filed Feb. 1, 1962, Ser. No. 170,350
Claims priority, application France, Feb. 3, 1961, 851,666, Patent 1,287,588
3 Claims. (Cl. 156—286)

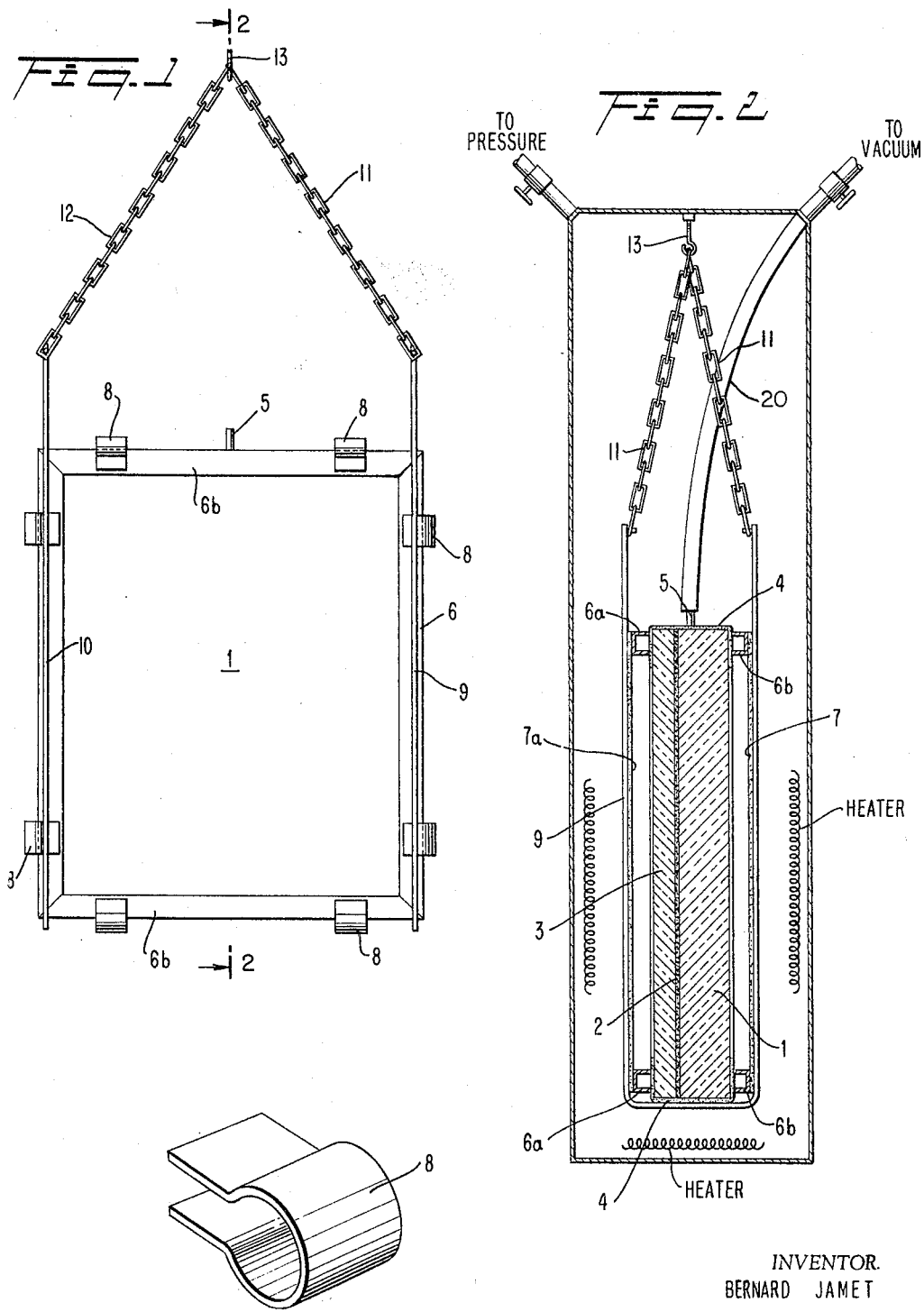

The present invention relates to the production of panels of polymethylmethacrylate having surfaces perfectly polished. Such panels, having an excellent transparency, being of light weight, and capable of absorbing mechanical vibrations, are useful for glazings of vehicles, particularly of airplanes.

Nevertheless, the polymethylmethacrylate currently used in said application for its good mechanical properties has a weak superficial hardness which gives rise to superficial cracklings, especially when in contact with the vapors of solvent, which constitutes an imperfection which requires frequent polishing of the faces.

On the other hand, another type of polymethylmethacrylate has good superficial hardness, so that the assembling of the two types of products by means of a polyvinyl-butyral interlayer provides a glazing satisfactory for mechanical strength and for superficial hardness.

It is known to prepare such laminates by placing the glazings horizontally on supports in an autoclave at a temperature as high as 135 to 140° C. to render the polyvinyl-butyral adherene, but at that temperature the polymethylmethacrylate is so soft that the support deteriorates the surface of the glazing which must be polished a second time, in many instances.

The present invention has an object to overcome such imperfections. According to the invention the assembling of the sheets of polymethylmethacrylate and the film of polyvinyl-butyral is obtained by placing the assembly of sheets vertically in the autoclave, evacuating the air from the interfaces, and heating progressively to the temperature at which the butyral is made adhesive. During these operations the air confined between the sheets and the film is simultaneously evacuated by means of vacuum. The autoclave is thereafter put under gas pressure to join the layers together.

Although the polymethylmethacrylate is plastic at the temperature necessary to render the polyvinyl-butyral adhesive, the sheets are not warped. Additionally, the assembling being obtained by gas pressure, that is without mechanical pressure plates, the faces are not marked and it is not necessary to proceed to a second polishing.

The vacuum device for evacuating the interfaces may be constituted by a tight gas seal, tightly secured to the edges of the sheet and connected by means of a pipe 20 to a vacuum device preferably located outside the autoclave. Practically, the seal may be a band of polyvinyl alcohol which is bonded to the edges of the sheets by simple moistening.

The edges of the sheets may be enclosed in a frame made of two annular elements tightened against the outlines of the sides of the sheets by clamps.

As an example, it is possible to join together, by the process of the invention, a sheet of polymethylmethacrylate, known under trademark "M33," which has a good mechanical strength, and a sheet of polymethylmethacrylate, known under trademark "Oroglass 55," which has good superficial hardness, by means of a film of polyvinyl butyral plasticized with dibutylsebacate.

The butyral is put under vacuum in the autoclave at room temperature. The vacuum is maintained during heating up to about 135° C. At said temperature the vacuum is suppressed and air under a pressure of 6 kg./cm.$^2$ is introduced to the autoclave, and such pressure and temperature is maintained during the time necessary to obtain the adhesion of the sheets.

Alternatively, a net of electrically resistant, metallic wires may be introduced in the intermediate film of polyvinyl-butyral. The heating panel thus obtained possesses sufficient flexiblity to bend without rupture of the net.

A form of the present invention is disclosed in the accompanying drawings, in which:

FIG. 1 is a vertical elevational view of a vertically suspended glazing.

FIG. 2 is a secional view taken along line 2—2 of FIG. 1.

FIG. 3 is a perspective view of a mounting clamp.

A sheet 1, of the polymethylmethacrylate named "M 33," of 22 m./m. thickness and a sheet 3, of polymethylmethacrylate named "Oroglass 55," of 2.5 m./m. thickness, are placed one over the other with the interposition of a film 2, 1 m./m. thick, of polyvinyl butyral plasticized with dibutyl sebacate. The periphery of said assembly is provided with a rectangular band 4 of polyvinyl alcohol, so that the marginal portions of sheets 1 and 3 are covered with adhesive band 4. Band 4 is applied after being moistened. Band 4 constituted a gas tight seal confining the edge of the sheets and film 2, and it includes a tube 5 for connection to a vacuum source, not shown (cf. FIG. 2).

On each side of said assembly is placed a metallic, rigid frame, 6a–6b, which bears on the portions of band 4 which overlap the side edges of the acrylate sheets. As is shown in the drawing, each frame comprises, for example, a pair of horizontal and vertical similar legs, such as the vertical leg 6 illustrated in FIG. 1.

On each of the two frames is placed a film, 7–7a, having a softening point higher than 140° C., for instance a polyester, to protect the sheets 1 and 3 from dust while permitting the application of the pressure to the faces by means of holes, punctures, or the like, not shown.

The two frames 6a–6b are then pressed against the side edges of the sheets by means of convenient clamps of any type, 8 for example, as shown in FIG. 3. Said clamps are intended to press the polymethylmethacrylate sheets against the butyral film, to avoid relative sliding, and to maintain the protective films in place. The number of clamps depends on the type of clamps and on the dimensions of the sheets. The clamps are not usually contiguous so that the pressure of the autoclave may extend to the whole faces of the sheets passing between the films 7–7a and the frames through the space between the clamps.

The resulting assembly is supported by two frame elements 9–10, which are suspended in the autoclave by chains 11–12 assembled to a link 13.

The heating in the autoclave may be obtained by forced convection, and to prevent the assembly from oscillating under the action of air currents, because the oscillations would promote warping of the polymethylmethacrylate, it is sufficient to place on both faces of the assembly two angle-irons each having a girder resting on the bottom of the autoclave and the other girder bearing on the frame.

As an example, the heating time to reach 135° C. is about 40 minutes and the time to perfect adhesion at the interfaces, at that temperature, about 20 minutes.

The polyvinyl butyral employed as the adhesive is indicated only as an example; other known types may be substituted without departing from the scope of the invention.

What is claimed is:
1. A method of producing a laminate consisting of polymethylmethacrylate sheets and a polyvinyl butyral interlayer which comprises assembling the sheets and layer, sealing the periphery thereof with a ribbon the edges of which are adhesively attached to the peripheral edges of the laminated sheets and the center of which is pneumatically open to the interfaces of sheets and interlayer, suspending the assembled laminate vertically within an autoclave, heating the laminate to a temperature at which the polyvinyl butyral is adhesive, and simultaneously increasing the pressure of the air within the autoclave bearing on the laminate and evacuating the air enclosed between the elements thereof through the ribbon, thereby sealing the sheets to the interlayer.

2. A method according to claim 1 comprising providing a solid protective porous film covering, and in non-contacting relationship with the exterior surfaces of the sheets, said film covering having a softening temperature higher than the temperature at which the butyral becomes adhesive.

3. Apparatus for manufacturing a laminated assembly of polymethylmethacrylate sheets having a self bonded interlayer of polyvinyl butyral therebetween, said apparatus comprising an autoclave, means therein for vertically suspending and clamping together the polymethylmethacrylate sheets and polyvinyl butyral in laminated relationship including ribbon sealing means for the periphery of the laminate, means for evacuating the gas from between said sheets and interlayer and for reducing the pressure between said sheets and interlayer through the ribbon, means for increasing the temperature and pneumatic pressure in said autoclave to attach said sheets to the interlayer, said suspending and clamping means including a pair of opposing frame members clampingly associated, and suspended from support means, each of said frame members abutting the edge of the exterior surface of a said sheet, the exterior surface of each said sheet being equally exposed to the atmosphere contained in said autoclave.

References Cited by the Examiner

UNITED STATES PATENTS

| | | |
|---|---|---|
| 2,369,593 | 2/1945 | Marks et al. |
| 2,464,826 | 3/1949 | Neher. |
| 2,783,176 | 2/1957 | Boicey _____ 161—248 X |
| 2,948,645 | 8/1960 | Keim _____ 156—104 |
| 2,992,953 | 7/1961 | Talburtt. |
| 3,074,841 | 1/1963 | King et al. _____ 161—248 |

EARL M. BERGERT, *Primary Examiner.*

J. J. BURNS, H. F. EPSTEIN, *Assistant Examiners.*